United States Patent [19]

Fournier et al.

[11] 4,369,992

[45] Jan. 25, 1983

[54] CONVOLUTED HOSE FITTING

[75] Inventors: Paul J. E. Fournier; Guenter O. Kunz, both of Jackson, Mich.

[73] Assignee: Aeroquip Corporation, Jackson, Mich.

[21] Appl. No.: 209,997

[22] Filed: Nov. 24, 1980

[51] Int. Cl.³ ............................................. F16L 33/20
[52] U.S. Cl. .................................... 285/256; 285/259; 285/DIG. 4
[58] Field of Search ......... 285/256, 251, 259, DIG. 4, 285/149 (U.S. only)

[56] References Cited

U.S. PATENT DOCUMENTS

| | | | |
|---|---|---|---|
| 1,343,967 | 6/1920 | Gilson | 285/256 |
| 1,802,499 | 4/1931 | Chapman | 285/259 X |
| 2,768,009 | 10/1956 | Currie | 285/251 |
| 3,078,109 | 2/1963 | Jackson et al. | 285/251 |
| 3,257,132 | 6/1966 | Lyons | 285/259 X |
| 3,347,571 | 10/1967 | New | 285/256 X |
| 3,381,981 | 5/1968 | Wilson | 285/149 |
| 3,539,207 | 11/1970 | Harris | 285/256 |
| 3,589,752 | 6/1971 | Spencer | 285/257 |
| 3,711,131 | 1/1973 | Evans | 285/256 |
| 3,951,438 | 4/1976 | Scales | 285/256 X |
| 3,990,728 | 11/1976 | Coughlin | 285/40 |
| 3,992,044 | 11/1976 | Muslin | 285/92 |

FOREIGN PATENT DOCUMENTS

| | | | |
|---|---|---|---|
| 685353 | 4/1964 | Canada | 285/256 |
| 810335 | 8/1951 | Fed. Rep. of Germany | 285/251 |
| 985190 | 3/1951 | France | 285/251 |
| 566051 | 8/1977 | U.S.S.R. | 285/256 |

Primary Examiner—Thomas F. Callaghan
Attorney, Agent, or Firm—Beaman & Beaman

[57] ABSTRACT

The invention pertains to a hose fitting particularly suitable with hose having a helical convoluted inner tube, and wherein the hose is formed of a synthetic plastic material. The fitting includes a tubular nipple having a helical projection upon which the hose inner tube is threaded, and a socket crimped upon the hose supported upon the nipple includes serrations for compressing the hose at predetermined locations. The nipple configuration aids in maintaining the hose upon the nipple in a fluid tight manner, and a socket tang receiving groove defined in the nipple axially maintains the socket in predetermined relationship to the nipple.

3 Claims, 3 Drawing Figures

CONVOLUTED HOSE FITTING

BACKGROUND OF THE INVENTION

In the hose fitting art, such as in pressurized hydraulic systems, tubular fittings are associated with the hose for permitting the hose to be attached to conduit components. The usual fitting construction includes a tubular nipple received within the hose bore, and the outer end of the nipple includes threads or other configurations whereby the nipple may be connected to other components of the system. The fitting often includes an annular socket circumscribing the hose mounted upon the nipple, and the socket may be inwardly crimped upon the nipple mounted hose to assure a fluid tight interconnection between the hose and nipple, and produce a mechanical interconnection capable of withstanding high tension forces. It is known to utilize mating elements between the socket and nipple to align and maintain the assembly of these components.

Examples of typical pressurized system hose end fittings are shown in U.S. Pat. Nos. 2,768,009; 3,539,207; 3,589,752 3,711,131 and 3,990,728.

Further, it is known to construct hose of a convoluted form wherein helical convolutions are defined within the hose for the purpose of improving hose flexibility and strength. Reinforcing elements may be associated with the convolutions. Fittings employed with convoluted hose have utilized spiral projections or threads defined upon a tubular nipple wherein the nipple convolutions correspond with those of the hose and the fitting is "threaded" into the hose bore. Fittings of this type are to be found in U.S. Pat. No. 3,078,109; 3,381,981 and 3,992,044. Because of the presence of the the hose convolutions, difficulty has been encountered in maintaining a fluid tight seal between convoluted hose and its associated fittings. Such difficulties are especially present when endeavoring to mount an end fitting upon convoluted hose utilizing polymerized tetrafluoroethylene such as commonly sold under the trademark "Teflon". Because of the lubricity and physical characteristics of Teflon inner tube hose considerable difficulty has been encountered in producing an acceptable end fitting for hose of such construction.

It is an object of the invention to provide a hose end fitting for hose having a convoluted inner tube wherein the fitting is of economical construction, readily accepts the hose upon a tubular nipple, and produces an effective fluid tight interconnection with the hose capable of withstanding high tension forces.

Another object of the invention is to produce a hose end fitting particularly suitable for hose having a synthetic plastic inner tube, the fitting utilizing a swaged socket, and the socket being of such configuration to cooperate with the nipple shape to improve sealing and tension characteristics, and wherein a high strength mechanical interconnection between the fitting nipple body and socket is achieved.

Yet another object of the invention is to provide a hose end fitting employing a swaged socket which is mechanically related to a nipple body, and wherein a rotatable nut mounted upon the nipple body will not inadvertently engage the socket, or interfere therewith, assuring uniform connection nut operation.

In the practice of the invention a tubular body includes a nipple having an outer surface upon which a helical projection is defined which is adapted to be threaded into the helical bore of a synthetic plastic convoluted hose inner tube. The helical nipple projection corresponds to the pitch of the hose helices, and an annular socket compresses the hose upon the nipple. The socket includes a tang which is radially received within a groove defined in the nipple to prevent axial displacement between nipple and socket, and inwardly projecting annular serrations are defined upon the socket inner surface for compressing the hose at specific locations.

The nipple outer surface receiving the hose also includes shaped sealing surfaces and grooves related to the socket serrations, and the nipple outer surface includes a "ramp" configuration having an increased diameter in the direction of the nipple hose receiving end which effectively resists tension forces interposed between the nipple and hose.

In a fitting utilizing a rotatably mounted connector nut upon the nipple the cooperating nipple and nut lands are so axially dimensioned as to prevent the socket from interferring with the nut operation, and the disclosed construction simplifies this type of hose end fitting as compared with fittings presently available for use with convoluted hose.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
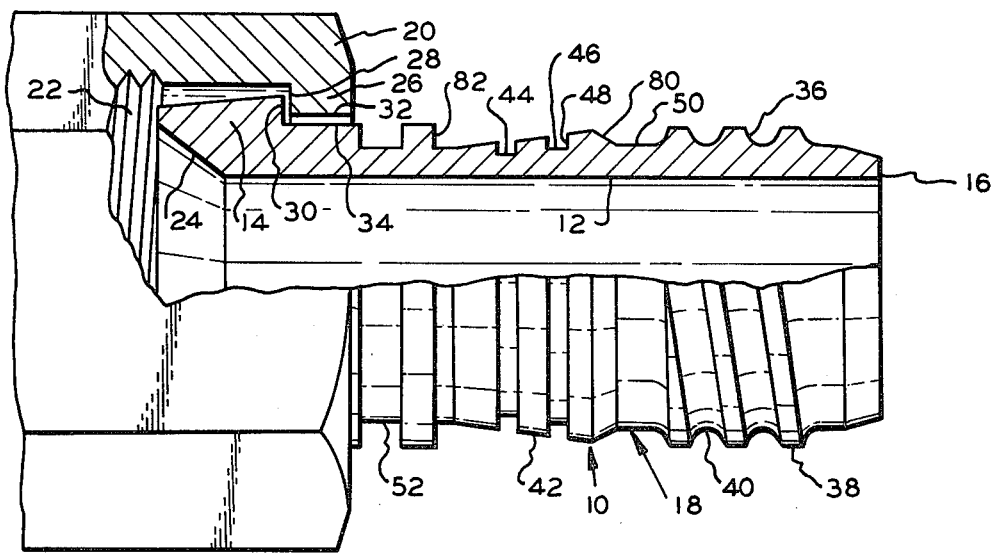
FIG. 1 is an elevational view, partially sectioned, of a nipple body and connector nut constructed in accord with the invention.

The basic component of the fitting is the nipple body 10 which is of an annular configuration having an axial cylindrical bore 12, an outer connection end 14, an inner end 16, and an outer surface 18. A hexagonal connector nut 20 is rotatably mounted upon the body 10 and includes internal threads 22 whereby the nut may be threaded upon the threads of a male conduit component, not shown, to draw the conical nipple sealing surface 24 into a sealed relationship therewith, as is well known.

The nut 20 includes a radially inwardly extending annular portion 26 defining the radial surface 28 which is axially aligned with the nipple radial abutment surface 30 whereby the nut is capable of exerting the necessary axial force on the nipple body. The nut includes a cylindrical axially extending land surface 32 of a diameter slightly larger than the cylindrical nipple land surface 34, and as will be appreciated from the drawings the axial dimension of the nipple surface 34 is greater than the axial dimension of the nut land surface 32.

The nipple outer surface 18 includes a helical projection 36 circumscribing the outer surface and disposed adjacent the nipple inner end 16. The cross section of the projection 36 will be appreciated from FIG. 1, and the apex of the projection comprises a relatively flat surface 38 having a diameter slightly less than surface 32, while the valley 40 intermediate the projection helices is of a concave arcuate configuration free of sharp edges. The pitch of the projection 36 corresponds to the pitch of the hose inner tube convolutions, as later described.

A reverse angle ramp surface 42 is defined on the outer surface 18, and this ramp comprises a conical surface having a diameter uniformly increasing in the direction toward the inner end 16. A pair of annular sealing grooves 44 and 46 are formed within the ramp surface 42, and these sealing grooves have a squared configuration defining radially extending sides 48 perpendicularly disposed to the nipple axis.

A substantially cylindrical "valley" 50 is defined between the ramp surface 42 and the projection 36, for a purpose later explained.

The fitting socket is mechanically interconnected to the nipple body by means of the annular socket tang groove 52 formed in the nipple adjacent the land surface 34. The tang groove 52 is defined by radial sides perpendicular to the nipple axis.

Figure 2:
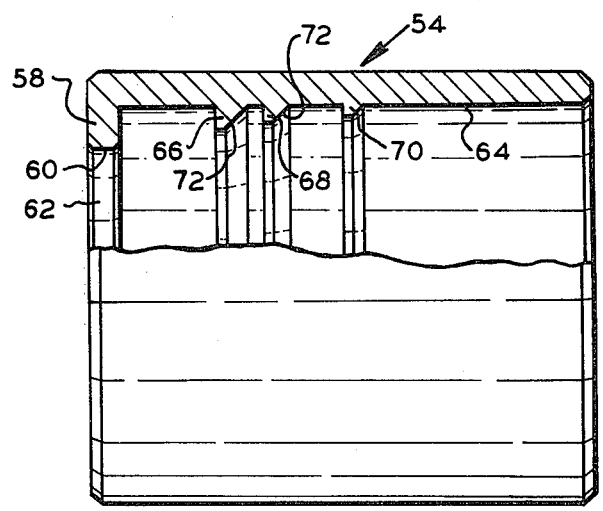
FIG. 2 is an elevational view, partially sectioned, illustrating the socket used with the fitting of the invention.
Figure 3:
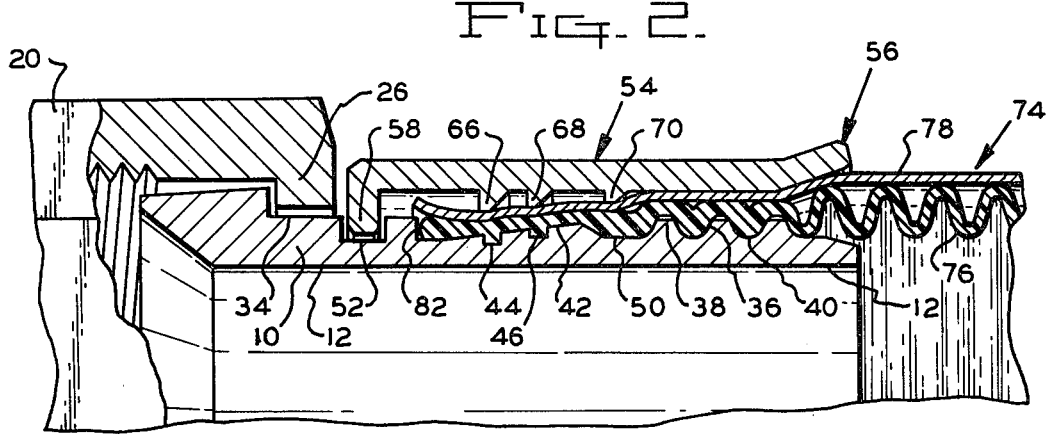
FIG. 3 is a detail, elevational, sectioned view of the fitting of the invention, the nipple and socket being in assembled relationship to the convoluted hose, and the socket having been crimped.

The fitting includes an annular socket 54, FIGS. 2 and 3, having an outer cylindrical surface which flares when crimped at 56, and at the opposite end the socket includes an annular inwardly extending tang 58 having an inward surface 60 which defines the socket opening 62. The socket inner surface 64 is of a generally cylindrical configuration, and includes annular sealing and locking serrations 66 and 68, and a secondary locking serration 70. The serrations are inwardly defined by cylindrical flat surfaces, and each of the serrations includes an obliquely disposed surface 72 which facilitates insertion of the hose into the socket during assembly.

The convoluted hose with which the disclosed fitting is preferably employed is shown in FIG. 3, and this hose 74 includes a convoluted inner tube or liner 76 formed of a synthetic plastic material such as polyetrafluoroethylene commonly known under the trademark "Teflon". The inner tube 76 is encompassed within a wire braid sheath 78. The hose construction is known, and constitutes no part of the present invention.

To assemble the fitting and hose the hose 74 is inserted into the socket 54. The nipple 10 is then inserted into the end of the hose 74 and rotated whereby the projection 36 threads into the convolutions of the hose inner tube and the tang 58 is radially aligned with the nipple groove 52. As the pitch of the projection 36 matches the pitch of the hose convolutions the assembly is facilitated. The obliquely disposed serration surfaces 72 aid in the reception of the hose between the socket and nipple, and the oblique surface 80 defined adjacent the ramp surface 42 also aids in inserting the fitting upon the nipple.

The nipple is inserted into the hose until the end of the hose engages nipple abutment surface 82, FIG. 3, and at this time the assembly may be placed within conventional socket crimping equipment and the socket radially crimped to compress the hose on the nipple. During such crimping the socket tang 58 pilots into the tang groove 52, and in this manner the socket is axially positioned in a positive manner with respect to the nipple body, and the socket will not axially displace with respect to the nipple under pressure or tension forces. The need for spacer rings, or other extra components, as is the usual practice, is eliminated by the disclosed construction.

In that the axial dimension of the nipple land surface 34 is greater than the axial dimension of the nut land portion 32 the nut 20 will not engage the socket 54 in a binding manner, and the use of the tang and groove assures that the nut will readily rotate upon the nipple.

Compression of the socket causes the locking serration 66 to force the material of the hose inner tube into the sealing groove 44, as shown in FIG. 3, and as the serration 68 is of slightly lesser radial dimension than the serration 66, as to correspond to the increasing diameter of the ramp surface 42, a uniform compression and sealing of the inner tube into the groove 46 is achieved.

Further, the configuration of the locking serrations 66 and 68 in opposed radial position to the ramp surface 42 produces frictional forces between the hose inner tube material and the ramp surface which effectively resists tension forces between the fitting and hose. The serrations 66 and 68 eliminate the need for Teflon seal tape, as presently used in fittings employed with convoluted inner tube hose, and the serrations prevent the hose from diametrically expanding and moving over the ramp surface 42.

The secondary locking serration 70 is in radial alignment with the nipple surface 50, and this produces a radial force on the hose forcing the hose against the surface 50 insuring that there is no axial movement of the hose in this region which could disturb the sealing action at the grooves 44 and 46, or allow the hose to pull from the fitting while the hose is under pressure or tension.

The sealing of hose having a convoluted synthetic plastic inner tube, and particularly with hoses having Teflon inner tubes, has previously been difficult to achieve. However, the disclosed fitting has successfully overcome the problems of prior fittings used with this type of hose, and designed fitting retention and assembly prerequisites have been achieved. The helical projection 36 permits ready insertion of the nipple into the hose in that the "threading" action is conducive to this insertion as compared with nonhelical nipple serrations, and the disclosed helical projection configuration does not produce undesirable stress locations within the hose.

It is appreciated that various modifications to the inventive concepts may be apparent to those skilled in the art without departing from the spirit and scope of the invention.

We claim:

1. A hose fitting for hose having a convoluted inner tube of synthetic plastic material comprising, in combination, a tubular nipple having a bore, an outer connection end, a hose receiving outer surface and an inner hose receiving end, connection means defined on said nipple connection end, a helical projection defined upon said nipple outer surface adjacent said inner end having a pitch substantially corresponding to the pitch of the convolutions of the hose inner tube to be received upon said outer surface, an annular socket circumscribing said nipple outer surface having an inner surface, a plurality of axially spaced locking annular serrations defined on said socket inner surface for engaging and compressing a hose mounted upon said nipple outer surface, said serrations each including a conical surface defined thereon on the side of the serrations disposed toward said nipple inner end and converging in a direction away from said nipple inner end whereby said conical surfaces aid in the insertion of hose upon said nipple and within said socket, said nipple outer surface in radial alignment with said locking serrations increasing in diameter in the axial direction from said outer end toward said inner end defining a reverse angle ramp to resist separation of a hose mounted on said nipple outer surface under tension forces, annular grooves defined in said nipple outer surface in radial alignment with at least two of said annular serrations, said grooves each including a radial side defining the groove side nearest said nipple inner end, and an annular secondary serration defined on said socket inner surface intermediate said reverse angle ramp and said helical projection to compress hose located on said nipple outer surface intermediate said locking serrations.

2. In a hose fitting as in claim 1, an annular tang groove defined in said nipple intermediate said hose receiving outer surface and said outer connection end, and a radially inwardly projecting tang defined upon said socket extending into said tang groove upon said socket being crimped inwardly.

3. In a hose fitting as in claim 2, a cylindrical nipple land surface defined on said nipple adjacent said tang groove intermediate said tang groove and nipple outer end axially defined by a radial shoulder disposed toward said outer end, a connection nut rotatably mounted on said nipple outer end having a cylindrical nut land surface radially opposed to said nipple land surface and having a radial shoulder in axial alignment with said nipple land surface shoulder for engagement therewith, said nipple land surface having a greater axial dimension than the axial dimension of said nut land surface to provide clearance between said nut and socket.

* * * * *